United States Patent [19]

Heideman

[11] Patent Number: 4,919,491
[45] Date of Patent: Apr. 24, 1990

[54] WHEEL ASSEMBLY

[76] Inventor: Robert J. Heideman, 34316 Barton, Westland, Mich. 48185

[21] Appl. No.: 160,921

[22] Filed: Feb. 26, 1988

[51] Int. Cl.$^5$ .............................................. B60B 37/10
[52] U.S. Cl. ............................... 301/124 R; 384/912; 301/114; 301/105 R
[58] Field of Search ................... 301/105 R, 106, 107, 301/109, 110, 111, 112, 114, 117, 122, 124 R, 125, 126, 131, 1, 5 R; 384/129, 261, 262, 276, 907, 912, 913

[56] References Cited

U.S. PATENT DOCUMENTS

| Re. 18,908 | 8/1933 | Van Derhoff | 384/912 X |
| 2,088,442 | 7/1937 | Sanchez | 301/124 R |
| 2,253,969 | 8/1941 | Dawihl | 384/129 |
| 3,321,213 | 5/1967 | Shoffner | 280/47.34 |
| 4,298,235 | 11/1981 | Squirrell | 384/912 X |
| 4,360,213 | 11/1982 | Rudwick et al. | 301/114 X |
| 4,754,494 | 6/1988 | Kumar | 384/913 X |
| 4,767,677 | 8/1988 | Kuwayama | 384/912 X |

FOREIGN PATENT DOCUMENTS

| 905240 | 11/1945 | France | 301/105 R |
| 1392172 | 4/1975 | United Kingdom | 301/105 R |
| 2096713 | 10/1982 | United Kingdom | 384/261 |

Primary Examiner—Russell D. Stormer
Attorney, Agent, or Firm—Krass and Young

[57] ABSTRACT

A wheel assembly especially suitable for use on large heavy refuse carts. The wheel assembly includes an axle which has been heat treated and plated to provide a central core, an outer skin on the central core of substantially increased strength and hardness, and a chromium plating on the outer skin, and the associated hub of the wheel has been heat treated to provide an annular interior skin in journalling association with the axle having an increased hardness and strength as compared to the main body of the hub. The chrome plating on the axle has a hardness in excess of the hardness of the interior hardened skin of the wheel hub. The wheel assembly is mounted between spaced parallel mounting plates on the associated refuse cart with the ends of the axle passing through apertures in the lower ends of the mounting plates and with the assembly held in place between the mounting plates by a bolt carrying a washer and threadably engaging a blind bore in one end of the axle so as to position an end plate on the other end of the axle against the outboard face of the outboard mounting plate. A pair of seals are provided at each end of the hub of the wheel and an annular grease groove is provided in the hub inboard of each pair of seals.

19 Claims, 3 Drawing Sheets

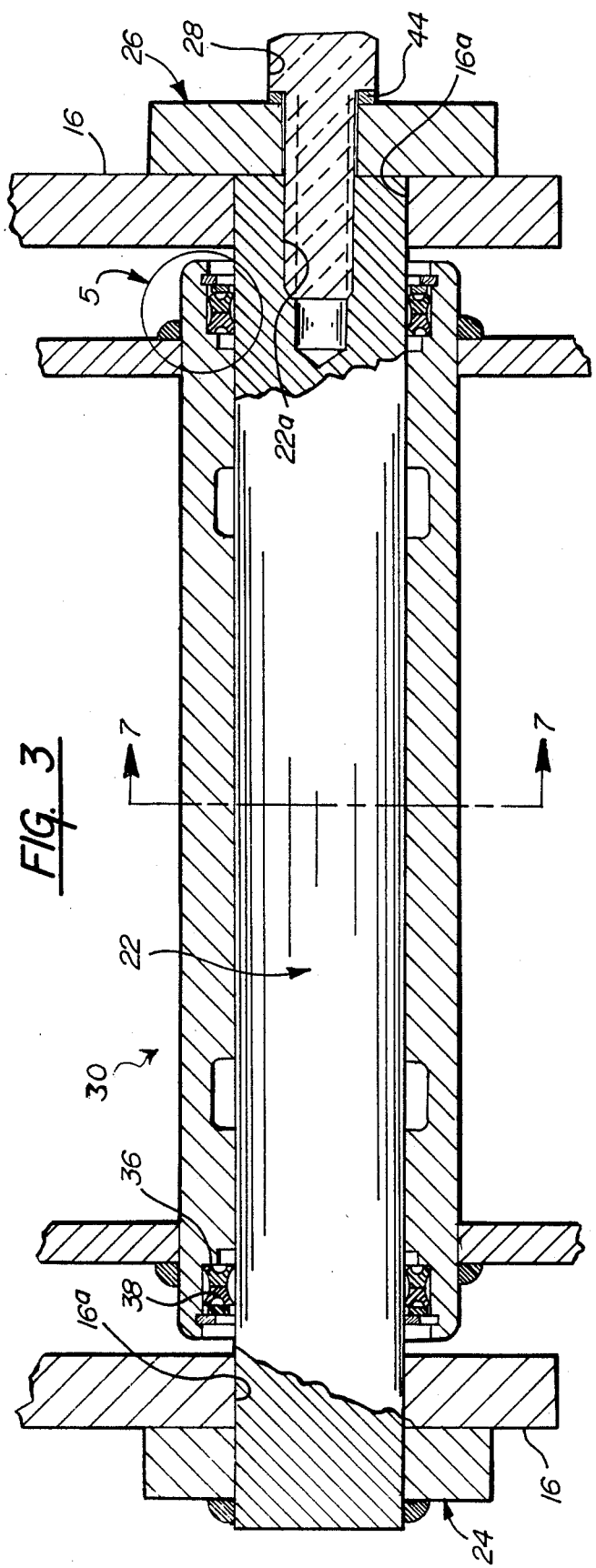
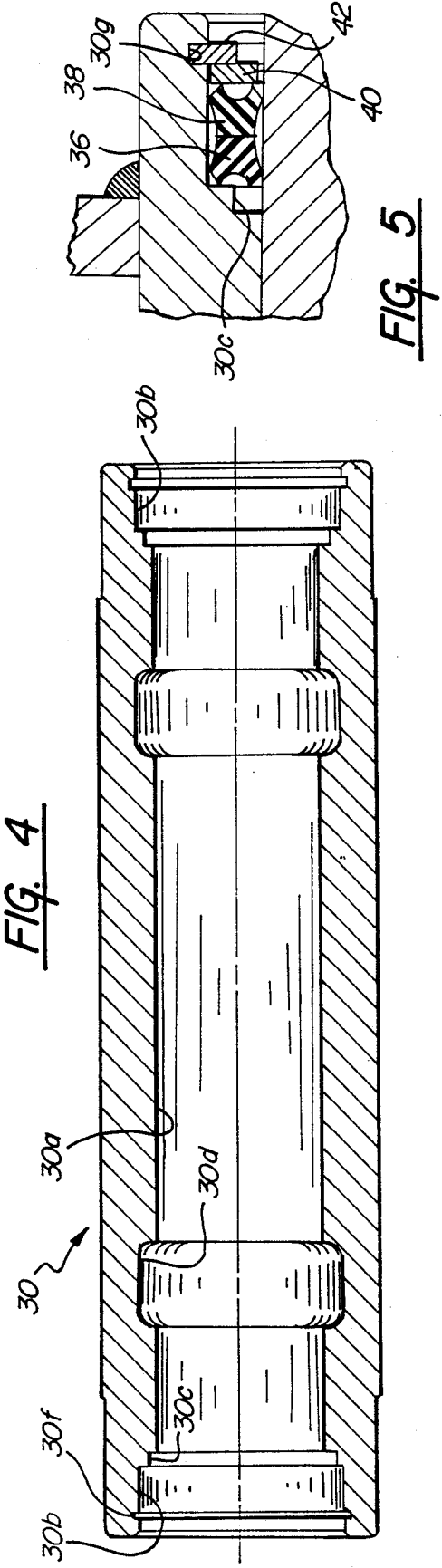

WHEEL ASSEMBLY

BACKGROUND OF THE INVENTION

This invention relates to wheel assemblies and more particularly to wheel assemblies especially adapted for use with large carts such as refuse carts.

With the ever increasing industrialization of our society, the need for a quick and efficient means of removing waste for ultimate disposal has steadily increased. The industry that has grown up to service this need has largely evolved in two directions. For relatively lighter and/or lower bulk waste disposal requirements, containers are provided at the user facility which, when filled with waste matter, are emptied into a refuse truck by a suitable hoisting mechanism and then replaced in position at the user facility to receive more refuse. In situations requiring larger volumes or heavier weights of refuse, the so-called "roll off" container or cart has been used. The roll off carts typically provide a capacity of between 12 and 40 cubic yards; may be used in association with an end compactor at the user facility; and are typically picked up and carried away when full on a custom vehicle, in piggyback style, with the vehicle carrying away the filled cart also delivering a new, empty cart to the user facility prior to pickup of the filled cart. These large refuse carts, in the course of loading and unloading onto the associated custom vehicle, receive considerable abuse. Since they must be dragged considerable distances both during the placement and the removal operations, they are typically provided with wheel assemblies at the four corners of the cart. The wheel assemblies sustain heavy abuse, not only because of the extremely heavy loads being carried in the carts, but also by virtue of the rough handling and the rough terrain over which the carts are dragged. The wheel assemblies in the past have generally comprised relatively standard designs in which a simple wheel is journalled on a hot rolled mild steel axle extending between parallel mounting plates on the corners of the cart. Due to the relatively unsophisticated design of the wheel assemblies and the extremely heavy abuse that the wheel assemblies receive, the wheel assemblies have become extremely high maintenance items. It is not unusual, for example, for the wheel assemblies to wear out to a point of being unusable in as short a time as three months. Typically the wheel assemblies are rebuilt, placed back in service, and then again rebuilt after which they again quickly wear out. A typical average total life of a wheel assembly, including several rebuilds, is about two years whereafter the entire wheel assembly must be replaced. In addition to the considerable expense associated with with rebuilding and ultimately replacing the wheel assemblies, the wheel assemblies may become dislodged during road transport on the associated vehicle and run wild and at high speed along the roadway, creating a potential for serious damage to other vehicles and/or personal injury. Further, since these containers are typically used in conjunction with an on site compactor, the cart can no longer be set at the proper height required for latching onto the compactor after it has lost a wheel assembly. Further, a container with a lost or severely damaged wheel assembly inflicts severe damage to the associated asphalt pavement onto which it is placed or over which it is dragged during the loading or unloading operation. Further, when a cart is taken out of service because of a damaged wheel assembly the cart must be brought into the main depot for maintenance and repair, resulting in time loss by the driver of the associated vehicle and revenue loss because the cart is out of service.

Various attempts have been made to introduce more sophistication into the wheel assemblies of these refuse carts in order to reduce the maintenance problem. For example, various attempts have been made to incorporate grease fittings so that lubrication can be added to the hub and axle assembly; other attempts have involved the use of roller or ball-type bearings in the wheel assemblies; and other attempts have involved the use of plastic or bronze bushings in the wheel assemblies. However, none of these attempts to improve the durability of the wheel assemblies has met with any degree of commercial success. Specifically, in the case of the lubricated wheel assemblies, the truck drivers are often remiss in greasing the axles on a regular schedule, the grease fittings become damaged and cannot be replenished with grease, or the grease fittings accumulate sand and dirt making it difficult or impossible to snap on the grease gun fitting or, even if greasing is possible, the greasing operation pumps in sand and dirt which in turn causes high abrasion failure of the axle and hub. In the case of the roller or ball-type bearing designs, it has been found that the extremely high gross vehicle weights and extremely high shock load forces encountered by these refuse carts causes immediate or eventual catastrophic failure to the internal bearing parts. In the case of the plastic or bronze bushing designs, the extremely high gross vehicle weights cause material flow-type deformation with resultant immediate or eventual failure of the wheel assembly.

SUMMARY OF THE INVENTION

This invention is directed to the provision of an improved wheel assembly especially suitable for use with refuse carts.

More particularly, this invention is directed to the provision of a wheel assembly for use with refuse carts which will provide many times the useful life of the wheel assemblies presently employed on the refuse carts.

The wheel assembly according to the invention includes a pair of flange plates adapted to be rigidly secured to a respective corner of the refuse cart and extend downwardly from the main body of the cart in parallel spaced relation; and aperture in the lower end of each flange plate; an axle passing slidably through the apertures in the flange plates and presenting a journal portion of round cross section between the plates; and a wheel comprising a tubular hub positioned between the flange plates and journalled on the axle journal portion, a rim, and means interconnecting the rim and hub in concentric relation. This simple arrangement provides an inexpensive but highly durable wheel assembly construction that is especially suitable for handling the high gross vehicle loads of the associated refuse carts.

According to a further feature of the invention, the axle journal portion and the hub, at their annular interface, are formed of different materials. This arrangement improves the wear qualities of the assembly.

According to a further feature of the invention, the axle journal portion, in cross section, comprises a metallic central portion and an annular outer layer forming a plating on the central portion having a hardness greater than that of the central portion. This hard plating further improves the wearability of the wheel assembly.

According to a further feature of the invention, the outer layer comprises a chromium layer. The use of a chromium layer further improves the wearability of the wheel assembly.

According to a further feature of the invention, the central portion of the axle journal portion is heat treated prior to application of the chromium layer to form a relatively soft core and a relatively harder outer skin directly beneath the chromium layer. This hard skin beneath the chromium layer provides structural strength for the chromium layer to preclude "punch through" damage to the chromium layer.

According to a further feature of the invention, the annular layer of the axle immediately underlying the hard outer skin has an average hardness substantially exceeding the hardness of the core of the axle but less than the hardness of the outer skin. This relatively hard intermediate layer provides support to the hard outer skin and coacts with the outer skin to provide exceptional structural integrity for the axle.

According to a further feature of the invention, the central core of the axle has a hardness greatly exceeding the hardness of a typical carbon steel so as to further add to the structural integrity of the axle.

According to a further feature of the invention, the hub is formed of a carbon steel and is heat treated to form a relatively soft annular main body portion and a relatively hard annular skin on the annular interior periphery of the main body portion. The relatively hard annular skin on the interior periphery of the hub portion coacts with the chromium plating on the axle to further enhance the wearability of the wheel assembly.

According to a further feature of the invention, the annular interior skin of the hub has a hardness less than that of the chromium layer on the axle. This specific relative hardness at the interface of the axle and hub further improves the wearability of the wheel assembly.

According to a further aspect of the invention, the axle journalling the hub has a length exceeding that of the hub so as to project axially beyond the hub at each end of the hub to provide mounting end portions for passage through aligned apertures in the spaced mounting plates on the associated body structure of the refuse container to mount the wheel assembly on the associated body structure and rollably support the body structure; a threaded bore is provided in one end of the axle; a bolt is provided which is sized to be threaded into the threaded bore; a washer is provided having an inner diameter sized to pass the bolt and an outer diameter greater than the diameter of the axle; and a plate member is rigidly secured to the other end of the axle and includes a portion extending radially outwardly beyond the axle.

This wheel assembly construction allows the wheel assembly to be mounted on the associated body structure by positioning the hub between the body structure mounting plates, passing the one end of the axle through the aperture in one mounting plate, through the hub, and through the aperture in the other mounting plate to bring the plate member into engagement with the outboard face of the one mounting plate, and threading the bolt with the washer thereon into the threaded bore in the axle to bring the washer into engagement with the outboard face of the outher mounting plate. Removal of the wheel assembly for repair or replacement is similarly readily accomplished.

BRIEF DESCRIPTION OF THE DRAWINGS

FIG. 3 is an enlarged cross-sectional view of the invention wheel assembly;

FIG. 4 is a cross-sectional view of a hub employed in the invention wheel assembly;

FIG. 5 is a detailed view taken within the circle 5 of FIG. 3;

DETAILED DESCRIPTION OF THE PREFERRED EMBODIMENT

Figure 1:
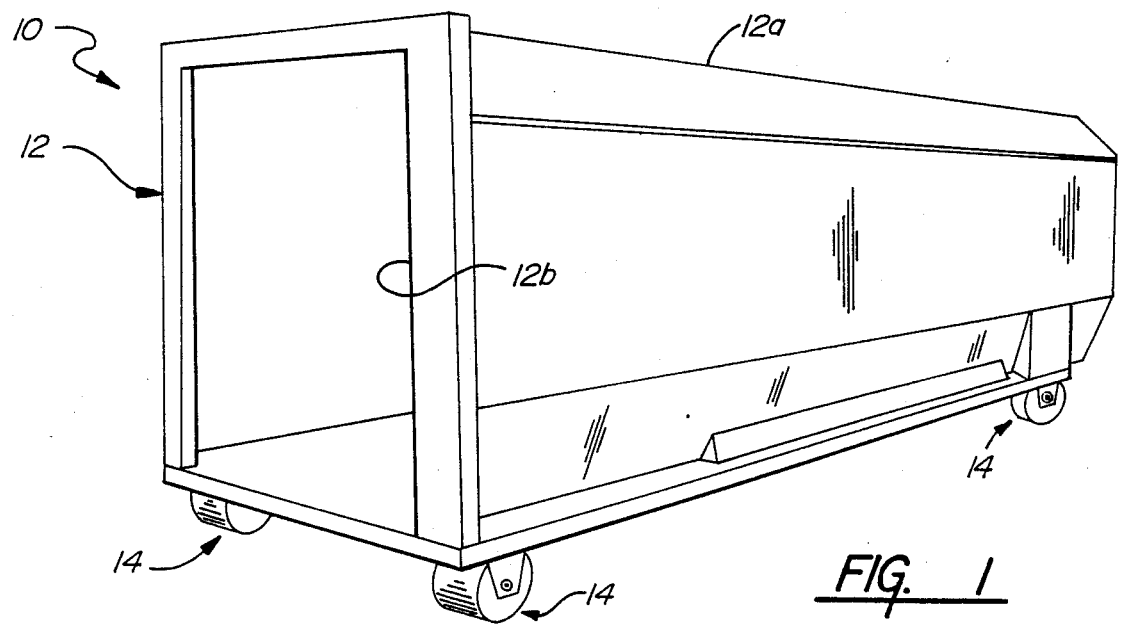
FIG. 1 is a diagrammatic perspective view of a refuse cart embodying the invention wheel assembly.
Figure 2:
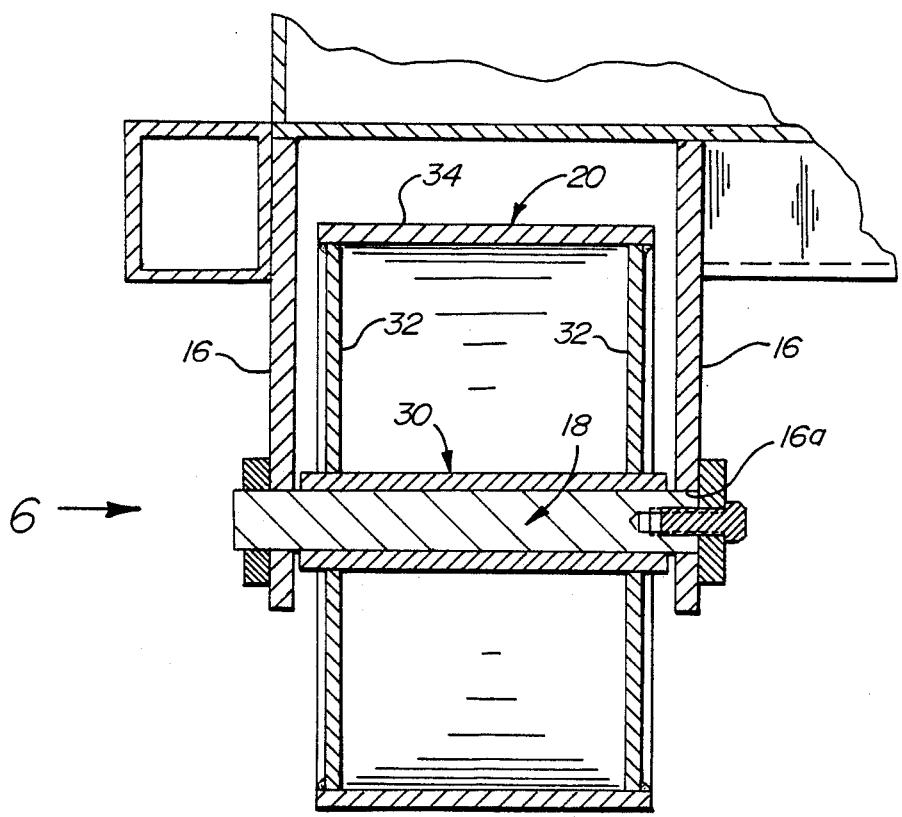
FIG. 2 is a cross-sectional view of one of the wheel assemblies employed in the refuse cart of FIG. 1.

The refuse cart 10 as seen schematically in FIG. 1 includes a body structure 12 of generally boxlike configuration with a closed top 12a, and an opening or door 12b in the rear end wall 12c of the cart. A wheel assembly 14 is provided at each corner of the cart to rollably support the cart. As previously indicated, the refuse cart 10 is intended to be carried in piggyback fashion on an associated vehicle to the user site, unloaded from the vehicle, placed in a user position in association with an end compactor with opening 12b juxtaposed to the compactor, and thereafter loaded back onto the associated vehicle after it has been filled with refuse.

Each wheel assembly 14 includes a pair of flange or mounting plates 16, an axle assembly 18, and a wheel assembly 20.

Plates 16 are formed of a suitable steel and are welded in spaced relation to the underside of the body structure 12 of the cart with two plates provided at each corner of the cart. Each plate tapers inwardly and downwardly and includes a circular aperture 16a in the lower end of the plate.

Axle assembly 18 includes an axle 22, an end plate 24, a washer 26, and a bolt 28.

Figure 7:
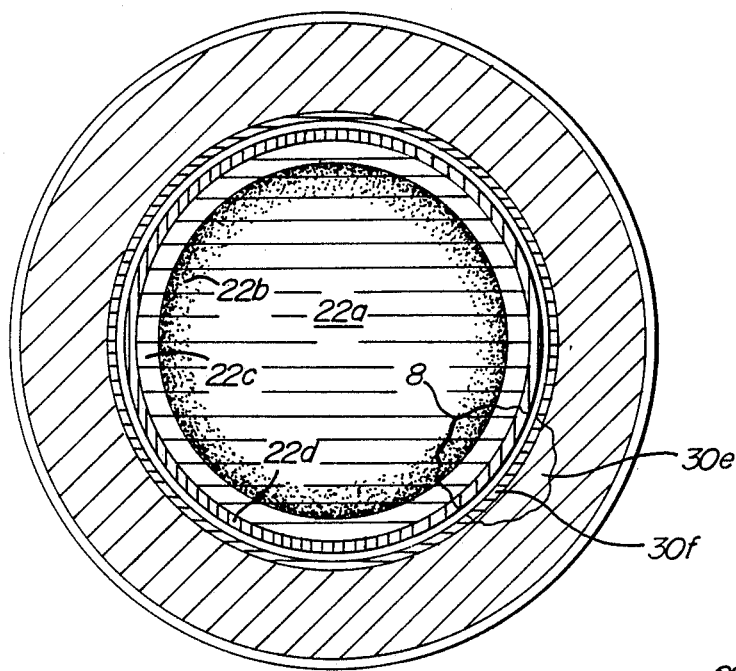
FIG. 7 is a cross-sectional view taken on line 7—7 of FIG. 3.
Figure 8:
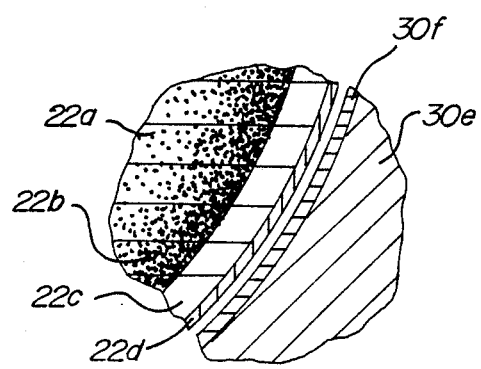
FIG. 8 is a detailed view taken within the circle 8 of FIG. 7.

Axle 22 is manufactured from a carbon steel stock containing, for example, 0.23% carbon, 0.80% magnesium, 0.23% silicon, 0.50% nickel, 0.50% chrome, and 0.20% molybdenum. The axle is machined to print specification and a blind threaded bore 22a is provided in one end of the axle. After machining, the axle is subjected to a temperature of 1,650 degress F. in an atmosphere of endothermic hydrocarbon generator gas for a period of four hours, then allowed to cool to 1,425 degrees F. The axle is then quenched in 70 degree F. oil. After removing the axle from the quench oil, it is subjected to a 350 degree F. bake for a period of two hours. This heat treatment process creates an axle having, in cross section and as best seen in FIGS. 7 and 8, a relatively soft central core 22a, a transient layer 22b of gradually increasing hardness, and an extremely hard annular outer skin 22c. As compared to a starting tensile strength of approximately 95,000 psi (12 $R_c$), the heat treated axle may have an internal core strength of 175,000 psi (38 $R_c$) which gradiently increases in layer 22b to 325,000 psi (60 $R_c$) at the inner periphery of the skin 22c and maintains at 60 $R_c$ throughout the thickness the skin 22c. For an axle having a diameter of 1.25 inches, layer 22b may have a thickness of approximately 0.06 inches and skin 22c may have a thickness of approximately 0.04 inches. The axle is then surface ground on the outside diameter to an exact size within 0.0005 inches on the diameter and is thereafter electroplated with chromium to a thickness of 0.0005 or a total of 0.0010 on the diameter. The chromium layer or plating is seen at 22d in FIGS. 7 and 8. Chromium layer 22d provides an $R_c$ of approximately 63. The axle is then subjected to a 350 degree F. bake to remove surface hydrogen generated by the electroplating process and absorbed by the axle surface. This relieves surface embrittlement. The choromium surface is then polished to a 16 microinch finish to give all parts a smooth running surface.

In the completed axle 22, the chromium layer 22d provides wearability at the axle/hub; the skin 22c provides structural strength for the chromium layer to preclude "punch through" damage to the chromium layer; the gradient layer 22b provides support for skin 22c and coacts with skin 22c to provide exceptional structural integrity for the axle; and the hardened central core 22a provides support for gradient layer 22b and coacts with the other layers to further add to the structural integrity of the axle.

End plate 24 is then welded onto the end of the axle remote from the threaded bore 22a to complete the axle assembly. Axle 22 has a length such that, when fitted in apertures 16a in mounting plates 16 with end plate 24 positioned against the outboard face of the outboard mounting plate 16, the annular end face of the axle around bore 22a is substantially flush with the outboard face of the inboard mounting flange 16.

Wheel 20 includes a central hub 30, a pair of wheel disks 32, and rim 34. The wheels at the rear of the cart are significantly wider than the wheels at the front of the cart to accommodate the differing loads encountered at the front and rear of the cart.

Wheel hub 30 is tubular and has a central bore 30a sized to slidably pass axle 22 with a journal fit; has a length such that it fits loosely between the inboard faces of the mounting plate 16; and is preferably manufactured from a carbon steel containing 0.25% carbon and 0.75% maganese. The hub is machined to print specifications, adding seal end pockets 30b formed as counterbores on each end of the hub, lubrication grooves 30c formed as further counterbores between each seal pocket 30b and central bore 30a, and lubrication reservoir grooves 30d spaced inboard from each counterbore 30b. After machining, the hub is preheated in an air furnace to 750 degrees F. and is then transferred into a specially formulated salt bath containing 50% potassium cyanide and 50% potassium cyanate, at 1,060 degrees F. The hub remains in the bath for two hours. The hub is then removed from the bath, allowed to cool to 700 degrees F. and quenched in oil, after which time it is removed and cleaned. This processing provides a hub which, as best seen in FIGS. 7 and 8, includes an annular core 30e which essentially retains its untreated tensile strength of 80,000 psi (5 $R_c$), and a hard nongalling interior peripheral skin 30f having a tensile strength of 285,000 psi (55 $R_c$). For a hub having a nominal outer diameter of 2.0 inches, skin 30f may have a thickness of 0.0005 inches. Skin 30f comprises a carbon bearing epsilon iron nitride containing no brittle $Fe_2N$. The heat treated hub is then passed through central apertures in the disks 32, the disks are welded to the hub, and the rim 34 is welded to the outer periphery of the disk 32 to form the wheel. Disks 32 are preferably inset with respect to the rim 34 so that the rim overlaps the disk at each side face of the wheel.

Prior to installing the wheel assemblies on the refuse cart, a grease seal 36 and a wiper or contaminate excluder seal 38 are fitted into each seal counterbore 30b. Grease seal 36 may comprise, for example, a seal available from the Grover Piston Ring Division of Fluorocarbon Corporation of Milwaukee, Wisconsin as U-Cup Style No. 15, and seal 38 may comprise, for example, a seal available from the same source as U-Pack Style No.30. As best seen in FIG. 5, the seals are maintained in position in counterbore 30b by a seal retainer 40 bearing against a seal retaining split ring 42 received in a groove 30g adjacent the outboard end of each counterbore 30.

Figure 6:
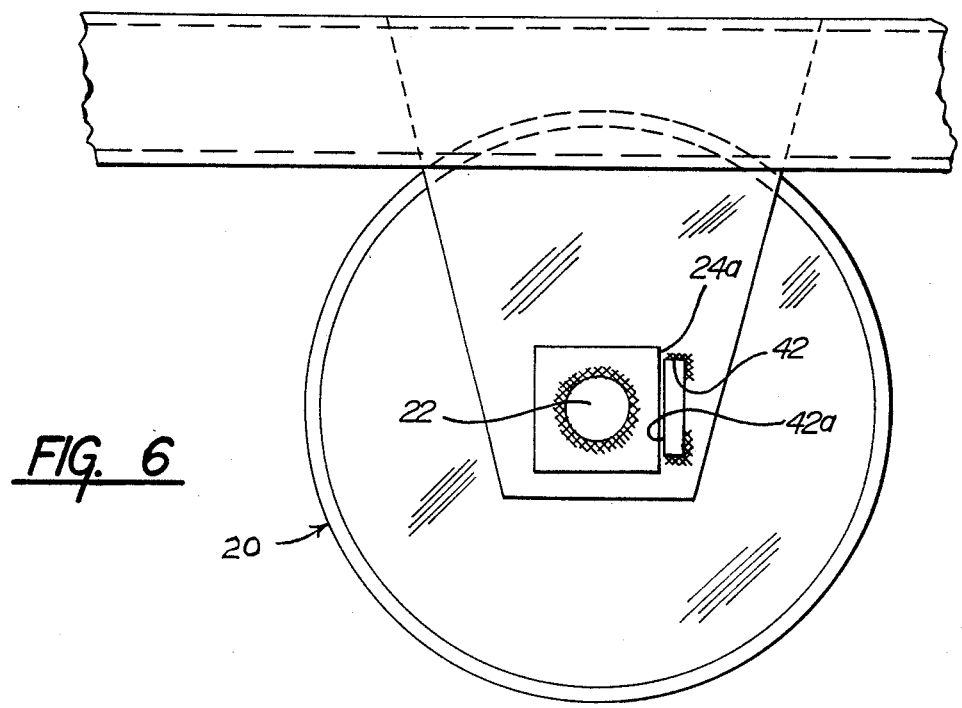
FIG. 6 is a view looking in the direction of the arrow 6 in FIG. 2.

Following positioning of the seals 36, 38 in the counterbores 30b, lubricant is provided in lubrication grooves 30c and 30d; bore 30a and axle 22 are heavily lubricated; wheel 20 is positioned between plates 16; and the threaded bore end of axle 22 is passed through the aperture 16a in the outboard mounting plate 16 and through the central bore 30a of hub 30 for passage through the aperture 16a of the inboard mounting plate 16. As previously indicated, axle 30 is sized so that the threaded end of the axle reaches a position flush with the outboard face of the inboard mounting plate 16 at such time as end plate 24 moves into engagement with the outboard face of the outboard mounting plate 16. Washer 26 and a lock washer 44 are now placed over bolt 28 and bolt 28 is threaded into threaded bore 22a to complete the assembly of the wheel assembly to the refuse cart. As best seen in FIG. 6, axle 22 is precluded from rotating relative to mounting plates 16 by engagement of a flat side face 24a of end plate 24 with a confronting side face 42a presented by a key 42 welded to the outboard face of the outboard mounting flange 16.

Removal of the wheel assembly for repair or replacement is readily accomplished by simply removing bolt 28 and sliding the axle assembly to the left as viewed in FIG. 3 to withdraw the axle from the mounting plates and allow the wheel 20 to be removed from between the mounting plates.

The invention wheel assembly, in actual test, as compared to well established data with respect to the standard hot rolled mild steel wheel assemblies long in use in association with refuse carts, has increased axle strength by an estimated factor of 3.5 and has increased wearability of the wheel assemblies many times. More specifically, whereas the prior art wheel assemblies typically require rebuilding every three months and have been totally useless after an average life of two years, the invention wheel assemblies have required no maintenance during a two-year period of test usage and, following disassembly after the two-year period of test usage, have shown no significant wear.

Whereas a preferred embodiment of the invention has been illustrated and described in detail it will be apparent that various changes may be made in the disclosed embodiment without departing from the scope or spirit of the invention. For example, at least in certain applications, plating 22d, rather than being formed of chromium, may comprise a nickel layer that is deposited on the axle and then baked to an $R_c$ of approximately 63.

I claim:

1. A wheel assembly for use at the four corners of a cart to rollably support the cart, said wheel assembly comprising:

(A) a pair of flange mounting plates adapted to be rigidly secured to a respective corner of the cart and extend downwardly from the main body of the cart in parallel spaced relation;

(B) an aperture in the lower end of each mounting plate;

(C) an axle passing slidably through said apertures in said mounting plates and presenting a journal portion of round cross section between said plates;

(D) a wheel comprising a tubular hub positioned between said mounting plates and journalled on said axle journal portion, a rim, and means rigidly interconnecting said rim and said hub in concentric relation;

(E) means defining an annular lubricant reservoir along the annular journal interface of said hub and said axle journal portion; and (F) an elastomeric annular seal at each end of said interface at opposite sides of said annular lubricant reservoir.

2. A wheel assembly according to claim 1 wherein:

(F) said axle journal portion and said hub, at their annular interface, are formed of different materials.

3. A wheel assembly according to claim 2 wherein:

(G) said axle journal portion in cross section comprises a metallic central portion and an annular outer layer forming a plating on said central portion having a hardness greater than that of said central portion.

4. A wheel assembly according to claim 3 wherein:

(H) said central portion is formed of an alloy steel; and (I) said outer layer is formed of a non-ferrous metallic element.

5. A wheel assembly according to claim 4 wherein:

(J) said central portion is heat treated prior to application of said outer layer to form a relatively soft core and a relatively hard outer skin directly beneath said outer layer.

6. A wheel assembly according to claim 5 wherein:

(K) said outer layer is formed of substantially pure chromium.

7. A wheel assembly according to claim 5 wherein:

(K) said hub is formed of carbon steel and is heat treated to form a relatively soft annular main body portion and a relatively hard annular skin on the annular interior periphery of said main body portion.

8. A wheel assembly according to claim 5 wherein:

(K) said annular interior skin of said hub has a hardness less than that of said outer layer on said axle.

9. A wheel assembly according to claim 8 wherein:

(L) said outer layer on said axle is formed of substantially pure chromium.

10. A wheel assembly comprising:

(A) an axle comprising a relatively soft alloy steel core, a relatively hard alloy steel skin surrounding said core, and a non-ferrous plating surrounding said hard skin; and (B) a wheel including an annular hub journalled on said axle and comprising a relatively soft carbon steel annular main body portion and a relatively hard annular skin on the annular interior periphery of said main body portion.

11. A wheel assembly according to claim 10 wherein:

(C) said non-ferrous plating is a chromium plating; and (D) said chromium plating has a hardness greater than the hardness of said annular interior skin of said hub.

12. A wheel assembly comprising:

(A) a wheel including a unitary one piece hub having a bore extending with a substantially uniform diameter from end to end of said hub and including a cylindrical central portion intermediate the ends thereof, a rim, and means rigidly interconnecting said rim and said hub in concentric relation;

(B) an axle positioned within said hub bore, having a diameter approximating the diameter of said bore, having a direct annular bearing interface with said bore including said central portion thereof, and having a length exceeding that of said hub so as to project axially beyond hub at each end of said hub to provide mounting end portions for passage through aligned apertures in spaced mounting plates on an associated body structure to mount said assembly on the associated body structure and rollably support the body structure;

(C) a threaded bore in one end of said axle;

(D) a bolt sized to be threaded into said threaded bore and having a head;

(E) a washer having an inner diameter sized to pass said bolt and an outer diameter greater than the diameter of said axle, said washer being sized and configured to allow the radially inner portion thereof to be moved into abutting engagement with said one end of said axle in response to threading of said bolt into said threaded bore to position the radially outer portion thereof radially outwardly of said axle; and (F) an end plate member rigidly secured to the other end of said axle and including a portion extending radially beyond said axle and having an inboard face spaced axially outboard from the confronting outboard face of said hub, whereby said wheel assembly may be mounted on the associated body structure by positioning said hub between the body structure mounting plates, passing said one end of said axle through the aperture in one mounting plate, through said hub, and through the aperture in the other mounting plate to bring said inboard face of said end plate member into engagement with the outboard face of the one mounting plate, and threading said bolt with said washer thereon into said threaded bore to bring said radially outer portion of said washer into proximity to the outboard face of the other mounting plate and bring said radially inner portion of said washer into abutting engagement with said one end of said axle.

13. A wheel assembly according to claim 12 wherein:

(G) said assembly further includes means for precluding rotation of said axle relative to the mounting plates.

14. A wheel assembly according to claim 13 wherein:

(H) said rotation precluding means includes a flat surface on said plate member adapted to coact with a flat surface defined on the outboard face of the one mounting plate.

15. A wheel assembly for use at the four corners of a cart to rollably support the cart, said wheel assembly comprising:

(A) a pair of flange mounting plates adapted to be rigidly secured to a respective corner of the cart and extend downwardly from the main body of the cart in parallel spaced relation;

(B) an aperture in the lower end of each mounting plate;

(C) an axle passing slidably through said apertures in said mounting plates and presenting a journal portion of round cross section between said plates; and (D) a wheel comprising a tubular hub positioned between said mounting plates and journalled on said axle journal portion, a rim, and means rigidly interconnecting said rim and said hub in concentric relation;

(E) said axle journal portion and said hub, at their annular interface, being formed of different materials;

(F) said axle journal portion in cross section comprising an alloy steel central portion and a non-ferrous metallic annular outer layer forming a plating on said central portion having a hardness greater than that of said central portion;

(G) said central portion being heat treated prior to application of said outer layer to form a relatively soft core and a relatively hard outer skin directly beneath said outer layer; and (H) said central portion further including an annular intermediate layer underlying said hard outer skin and having a hardness less than the hardness of said outher skin but greater than the hardness of the inner core of the axle.

16. A wheel assembly according to claim 15 wherein:

(K) said axle is manufactured from an alloy steel;

(L) said inner core has a hardness greatly exceeding the hardness of the untreated alloy steel; and (M) said intermediate layer has a hardness gradually increasing, moving radially outwardly, from the hardness of said inner core to the hardness of said outer skin.

17. A wheel assembly comprising:

(A) a wheel including a hub, a rim, and means rigidly interconnecting said rim and said hub in concentric relation;

(B) an axle journalling said hub and having a length exceeding that of said hub so as to project axially beyond said hub at each end of said hub to provide mounting end portions for passage through aligned apertures in spaced mounting plates on an associated body structure to mount said assembly on the associated body structure and rollably support the body structure;

(C) a threaded bore in one end of said axle;

(D) a bolt sized to be threaded into said threaded bore and having a head;

(E) a washer having an inner diameter sized to pass said bolt and an outer diameter greater than the diameter of said axle; and (F) an end plate member rigidly secured to the other end of said axle and including a portion extending radially beyond said axle;

(G) said axle comprising a relatively soft alloy steel core, a relatively hard alloy steel skin surrounding said core, and a non-ferrous plating surrounding said skin;

(H) said hub comprising a relatively soft carbon steel annular main body portion and a relatively hard annular skin on the annular interior periphery of said main body portion.

18. A wheel assembly according to claim 17 wherein:

(H) said non-ferrous plating is chromium plating; and (I) said chromium plating has a hardness greater than the hardness of said annular interior skin of said hub.

19. A wheel assembly according to claim 1 wherein two annular lubricant reservoirs are provided along said annular journal interface between said seals with each reservoir positioned proximate an end of said annular journal interface. 236

* * * * *